Dec. 25, 1934.  A. J. LEWIS  1,985,612
AUTOMATIC STOP FOR CHUCKING MACHINES
Filed April 22, 1933   3 Sheets-Sheet 1
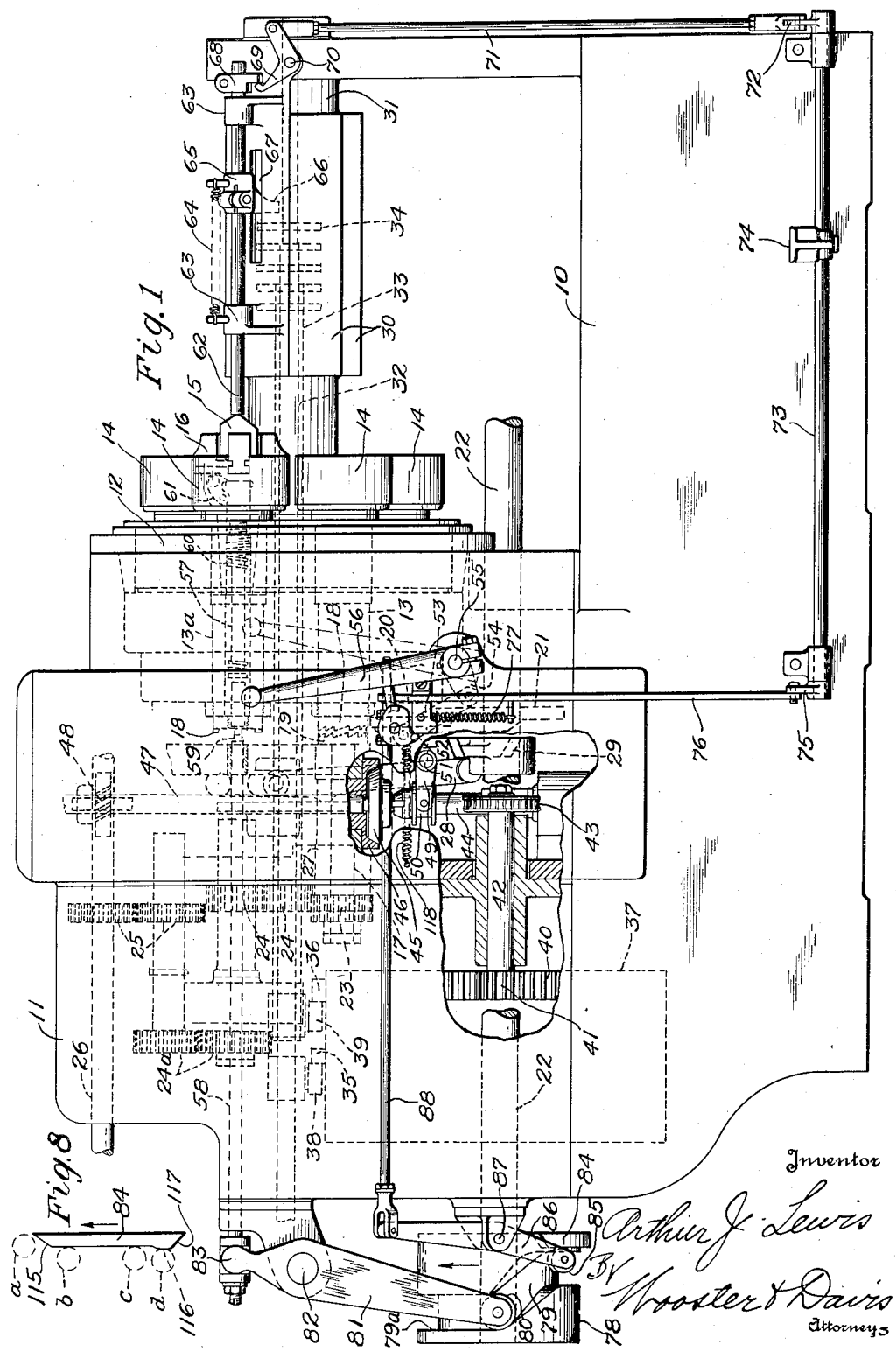
Inventor
Arthur J. Lewis
By Wooster & Davis
Attorneys

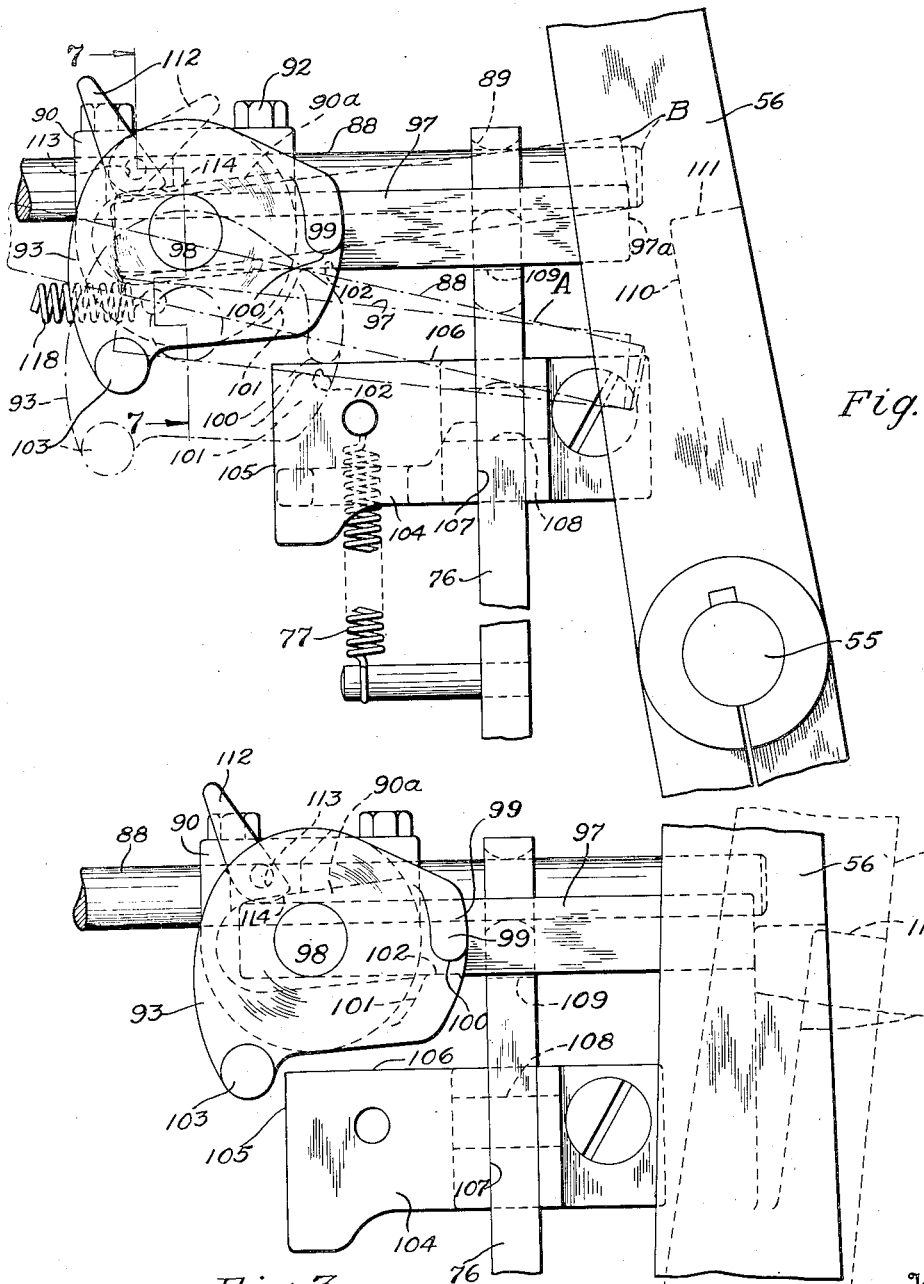

Dec. 25, 1934.  A. J. LEWIS  1,985,612
AUTOMATIC STOP FOR CHUCKING MACHINES
Filed April 22, 1933    3 Sheets-Sheet 3
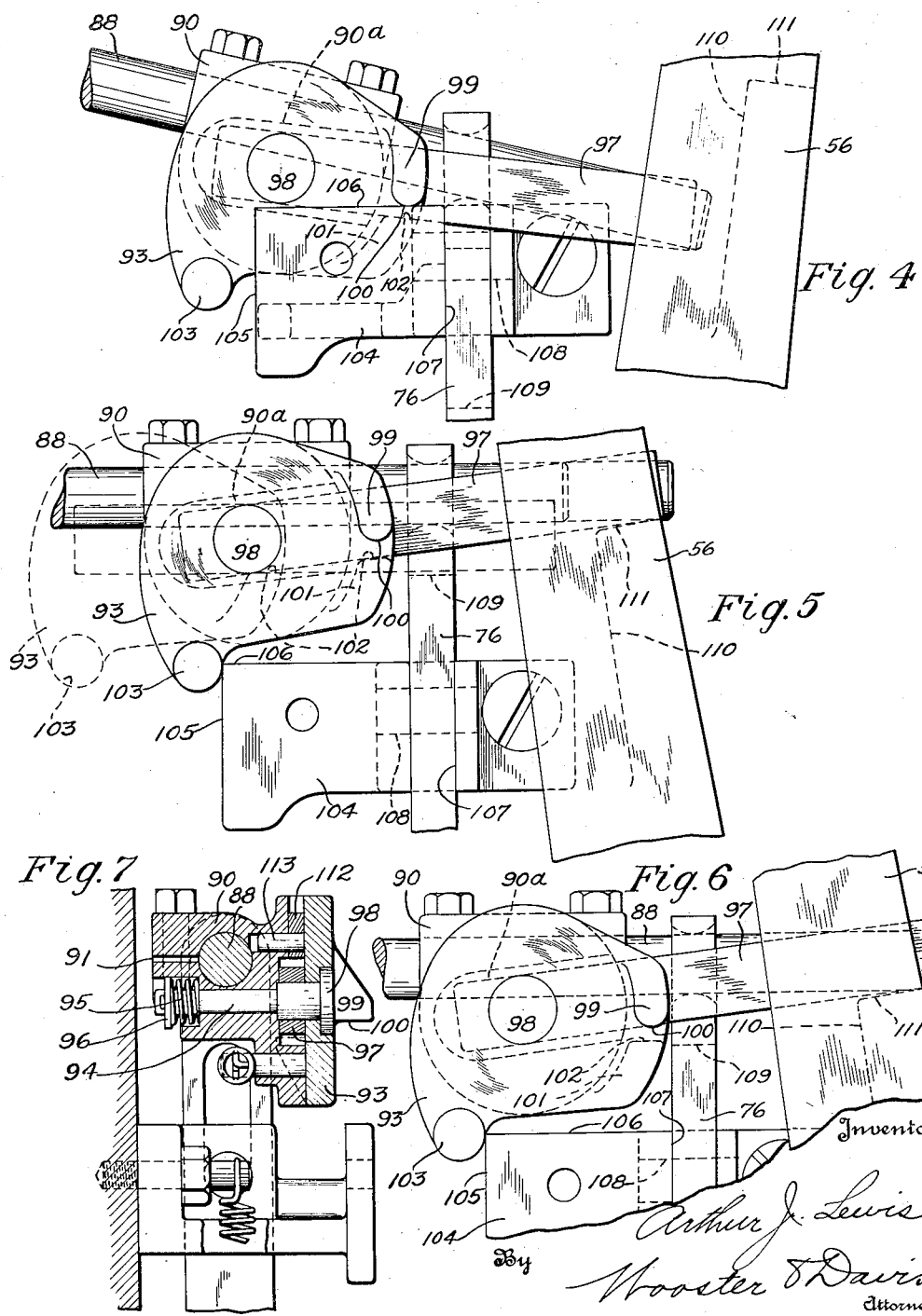

Patented Dec. 25, 1934

1,985,612

UNITED STATES PATENT OFFICE 1,985,612

AUTOMATIC STOP FOR CHUCKING MACHINES

Arthur J. Lewis, Stratford, Conn., assignor to The Baird Machine Company, Bridgeport, Conn., a corporation of Connecticut Application April 22, 1933, Serial No. 667,336

19 Claims. (Cl. 29—38)

This invention relates to chucking machines of the type in which there is an indexing turret in which are mounted a plurality of work carrying spindles provided with chucks for holding the work thus providing a plurality of working stations and one or more loading stations, and it relates more particularly to an automatic stop for this type of machine which has for its main object to under certain conditions automatically stop functioning of the machine to prevent a piece of work going through the machine twice and being spoiled.

Another object of the invention is to provide a device which will prevent indexing of the turret if the operator has not completed the loading operation at the time the indexing would normally take place.

Other objects and advantages of the invention will be apparent from a detailed description of the invention taken in connection with the accompanying drawings. It is, however, to be understood that the invention is not limited to the details of construction shown but can be modified without departing from the real invention.

In the accompanying drawings this improved stop and safety device is shown as applied to a chucking machine as described and claimed in my prior Patent No. 1,796,797 issued March 17, 1931.

In these drawings:

Fig. 1 is a front elevation of a chucking machine showing my improved stop device applied thereto, parts being broken away to more clearly show the construction;

Fig. 2 is a front elevation on an enlarged scale of the control elements of the stop in the normal running position;

Fig. 3 is a similar view showing the second position of the elements to stop the machine under certain conditions;

Fig. 4 shows the position of the elements during loading operation if the machine is stopped;

Fig. 5 shows the position of the elements if the machine is loaded without stopping;

Fig. 6 is a similar view showing the position of the elements to reset the stop device;

Fig. 7 is a partial section and a partial end view, the section being substantially on the line 7—7 of Fig. 2; and Fig. 8 is a development of the stop operating cam showing various positions of the follower thereon.

As indicated above, the chucking machine illustrated is that disclosed in my prior Patent No. 1,796,797, but of course this stop means may be used with other constructions, this particular machine being used for illustration.

The machine illustrated comprises a bed 10 on which is mounted a frame 11 and within which is mounted a rotatable turret 12 carrying any suitable number of working spindles 13 each of which carries a chuck 14 of any suitable type to hold the work, indicated at 15 in one chuck only for simplicity in illustrating. I have also shown the movable chuck jaws 16 in one chuck only for the same reason. These spindles provide a plurality of working stations about the axis of the turret and one or more loading stations. As clearly set forth in the patent mentioned each of the spindles at the working stations is driven by a drive shaft or spindle which I have indicated in dotted lines at 17, and I have shown only one of these drive spindles, but it is to be understood there is a drive spindle for each shaft of the working spindles 13 at each of the working stations, but there is no drive for the spindle at the loading station or stations, which in the drawings is the spindle 13a. The spindles are shown and provided at their inner ends with a clutch member 18 and each of the drive shaft or spindles 17 has a complementary clutch member 19 adapted to engage therewith for driving each work spindle when it is in alignment with the various drive shafts. The turret is mounted to be rotated or indexed with a step by step movement to carry the work spindles from the loading station 13a through the various working stations and back to the loading station. Any suitable indexing mechanism may be employed, such for example as an arm 20 mounted in a holder 21 on a cam shaft 22 so that on each rotation of the cam shaft the turret will be indexed, the arm 20 engaging the projecting collar carrying the clutch 18 on the work spindle. The driving shaft or spindles 17 are driven by any suitable means such as gears 23 meshing with gears 24 driven by gear chains 24a and 25 from a power shaft 26 receiving power from any suitable source, not shown. As disclosed in the prior patent, each shaft 17 is mounted in a sleeve 27 mounted to slide longitudinally in frame 11 to connect and disconnect clutches 18 and 19. The shafts 17 are all shifted simultaneously by a lever arm 28 operated by a cam 29 on the cam shaft 22. Therefore the shifting of the drive spindles 17 is in certain timed relation with the indexing of the turret, the clutches being first disconnected, the turret indexed and then the shafts 17 again shifted toward the work spindles to cause the clutches to engage.

Tools for performing various operations at the working stations are carried by suitable tool carriers, not shown, mounted to slide longitudinally on guides 30 carried on a longitudinally extending support 31 projecting forwardly from the turret. Extending longitudinally within this support is a tool operating shaft 32 and a tool operating sleeve 33 provided with any suitable means such as collars or flanges 34 for connection to the tool carriers. These tool operating or feed elements 32 and 33 are operated by cams 35 and 36 on a cam drum 37 mounted on the shaft 22, these cams operating through followers 38 and 39 connected to the elements 32 and 33. The cam drum 37 has an internal gear 40 meshing with a pinion 41 on a shaft 42 driven by a worm gear 43 meshing with a worm, not shown, on a shaft 44. Mounted to slide longitudinally on this shaft and having driving connection therewith is an internal clutch member 45 adapted to seat within an external clutch member 46 mounted on a shaft 47 driven from the power shaft 26 by any suitable gearing 48. Clutch member 45 may be shifted to connect and disconnect the clutch drive to the shaft 42, the mechanism shown comprising an arm 49 having rollers or shoes running in a groove in collar 50 and pivoted at 51. Another arm 52 connected thereto is connected by a link 53 to an arm 54 operated by a shaft 55 to which is connected a hand lever 56.

The jaws 16 of the chuck 14 for holding the work are adapted to be operated automatically at the loading station in certain timed relation with the indexing operation. I have not shown the details of this chuck as it is also shown in my prior patent above mentioned and may be of the type disclosed in my prior Patent No. 1,839,400, issued January 5, 1931. In this chuck the jaws 16 are moved outwardly to release the work by shifting to the right or toward the jaws a longitudinal rod 57 extending through the center of the spindle 13. The outer or rear end of this rod is exposed at the clutch end 18 of the spindle for engagement by a sliding operating rod 58, it being understood that when rod 18 is shifted to the right its end 59 will engage the end of the rod 57 to shift the chuck jaws 16 to open position, and when the rod 58 is shifted to the left or away from the chuck a spring 60 will shift the rod 57 to the left and through the operating levers 61 will clamp the jaws 16 on the work 15. Thus the chuck jaws are normally automatically closed on the work to hold it when positioned. The chuck releasing rod 58 is located only at the loading station so as to release only the chuck 14 at that station to permit removal of a finished piece of work and the insertion of a new or unfinished piece of work in the chuck at that station.

Also located at the loading station is a manually operable means for retaining the work in the chuck while the chuck is open and thus prevent the work dropping from the chuck unless the operator is in a position to take care of it, and it also operates to retain a new piece of work in the open chuck until the chuck is permitted to close by the automatic control. This holding device in the structure illustrated comprises a plunger 62 mounted to slide longitudinally in suitable bearings 63. A spring 64 is connected at one end to the left hand bearing 63 and at the other end to a collar 65 clamped on the plunger tends to move the plunger toward the work and to retain the work in the open chuck. The collar 65 also has an extension 66 extending through a slot 67 into the path of movement of one of the collars 34 so that when the tools are shifted away from the work at the completion of the working operation and before the indexing operation this plunger may also be moved away from the work automatically and held there during the indexing operation. The plunger may furthermore be removed from the work by an operator when desired through a second collar 68 mounted on the bar and engaged by an arm of the lever 69 pivoted at 70, the other arm of which is connected by a rod 71 to an arm 72 on a shaft 73 adapted to be operated by a foot treadle 74. It will be evident that if the operator depresses the treadle 74 he will shift the work holding plunger 62 to the right or away from the work 15 in the chuck at the loading station 13a. The shaft 17 also carries an arm 75 connecting to a vertically reciprocable rod 76 normally held in its upper position by a spring 77 connected at one end to this rod and at its other end to the frame of the machine.

It will be evident that as this spring tends to elevate the rod 76 it will also normally hold the pedal 74 in its upper position and the lever 69 in the position to permit the plunger 62 to be held against the work in the chuck at the loading station.

Also mounted on the shaft 22 so as to turn therewith and therefore be operated in certain time relation with the indexing of the turret and the operation of the working tools is a cam 78 which has a cam groove 79 in which runs a follower or roller 80 on one arm of the lever 81 pivoted at 82 and connected at its opposite end 83 to the rod 58 to operate it. Thus it will be seen that the rod 58 is operated to open the chuck at the loading station in certain timed relation with the indexing operation of the turret. Also rotatable with the cam 78 is another cam 84 adapted to operate a follower 85 on a lever 86 pivoted at 87 and connected to a rod 88 extending at its free end through an opening 89 adjacent the upper end of the vertically shiftable bar 76 as shown more clearly in Figs. 3 to 6.

The safety stop mechanism is mounted on this rod 88 to be operated thereby. This stop mechanism is shown more clearly in Figs. 2 to 7. It comprises a body member 90 mounted on the rod 88. In the present construction this body is split at 91 and clamped to the rod by screws 92 so as to move with the rod. Pivoted to the front of this body is a catch control member 93, and it is mounted for pivotal movement on a stud 94 extending through the member 90 and embraced at its inner end by a coiled spring 95 pressing at one end against the body 90 and at its opposite end against a washer 96 on the stud so that the spring tends to shift this stud to the left or inwardly as viewed in Fig. 7. Also, pivotally mounted on this stud 94 is a catch lever 97 the rear end portion of which is in a recess 90a in the front wall of member 90. The stud has a head 98 recessed into the member 93 and therefore it will be evident that the spring 95 clamps the member 93 against the body 90 so that this member 93 is frictionally held in any position to which it is turned. The member 93 carries on its front wall a lug 99 providing a shoulder 100 and on its rear wall it carries a lug 101 providing a shoulder 102. This member also carries a forwardly projecting lug 103. Mounted on the frame 11 of the machine is a block or bracket 104 having an end wall 105 to be engaged under certain conditions by the lug 103 and a top wall 106 to be engaged under certain conditions by the shoulder 100 as will be more fully disclosed later. This block or bracket 104 also has a guide 107 for the bar 76 in which it is guided for reciprocating movement by any suitable means, such as a pin 108 extending transversely through a slot 109 in the bar 76. It will be noted these elements and the end of the rod 88 are mounted adjacent the stop lever 56 which lever carries a rearwardly projecting lug 110 on its rear wall in position to be engaged by the ends of the rod 88 and the latch 97 under certain conditions as will be more fully described later. The lug 110 is provided at its upper end with a shoulder 111.

Mounted on the body 90 is a throw-off 112, it being mounted by means of a pivot pin 113. This throw-off has an eccentric cam 114 to engage the catch lever 97 and hold it in an inoperative position as shown in the dotted lines Fig. 2 to render the automatic stop ineffective.

The operation is as follows:

During normal operation of the chucking machine the turret 12 carrying the work spindles and the chucks carrying the work to be operated upon is indexed between two working cycles to shift the work from the loading station 13a to the various working stations where the various operations are performed upon the work by the various tools, it being understood that the work spindles 13 and the work carried in the chucks on these spindles will be rotated at the working stations by the driving shafts 17 through the engaging clutch elements 18 and 19. It will also be understood that during the working cycle various tools are advanced or fed by the cams 35 and 36 and that when the various cuts of the tools are completed these cams will shift the tools to the right as viewed in Fig. 1, or that is away from the work to permit the turret to be indexed. Before the turret can be indexed, however, the drive spindles 17 are shifted away from the work spindles by the cam 29 to release the clutch drives 18 and 19, and the indexing mechanism 20, 21, also operated by the shaft 22, can then function to index the turret.

After the indexing operation the cam 29 permits the drive shafts 17 to be shifted toward the work spindles at the working stations to engage the clutches 18 and 19 at these stations and thus drive the work spindles at the working stations. Then the cams 35 and 36 advance tools to perform the various operations on the work.

The tool feed cams 35 and 36 are so arranged as to withdraw the tools from the work by shifting them to the right away from the work at the end of a work cycle and prior to the indexing operation. At the end of a working operation or cycle the plunger or bar 62 is drawn back with the tools through the connection 66 engaging the outer side of member 34 on one of the shafts 32 or 33 and all the chucks remain closed during the indexing operation. After the indexing operation has been completed the tools move forward to start the next working cycle and at the same time permit the plunger 62 to advance into engagement with the finished work, indicated at 15, in the chuck at the loading station. This chuck is then opened by the rod 58 through the action of cam 78, the work being retained in the chuck and prevented from dropping therefrom by the plunger or bar 62.

It will be evident that as the chuck is now open, the operator may withdraw the bar 62 and remove the finished piece of work 15 from the chuck. He withdraws the bar 62 to release the work by pressing with his foot on the treadle 74. It will also be evident that while the bar 62 is withdrawn he can then insert a new or unfinished piece of work in the open chuck, and then by releasing the pedal 74 the bar 62 will be moved to engage this new unfinished piece of work and retain it in the chuck until the chuck jaws are permitted to close upon it.

We will now consider the operation of the safety stop device under various conditions.

Under normal operations the operator removes the piece of finished work from the open chuck at the loading station 13a while the working operations are being performed by the tools on the work at the working stations and inserts a new or unfinished piece of work in the open chuck before the working operations have been completed so that everything is ready for the next indexing operation after the working cycle has been completed. When the machine is running in normal operation the stop lever 56 is at the left or is in the full line positions of Figs. 1 and 2 which will permit the clutch 45, 46 to engage and the cam shaft 22 with its various cams will be driven through this clutch and the shaft 22. Also in normal operation the bar 88 and the stop catch 97 are in the full line position of Fig. 2. As indicated above the cam 79 holds the chuck at the loading station open during the working operation. If the operator comes to the machine after the chuck at the loading station has been opened as above described he presses the pedal 74 to retract the holding bar 62 and removes the finished piece of work and inserts a new piece of work and then releases the pedal 74. If he releases this pedal before the working operation is completed then the machine will not stop, but the chuck at the loading station will close prior to the indexing of the turret, the turret will be indexed, the next working cycle started, and the chuck now in the loading station will be automatically opened to permit the finished piece of work to be removed and the non-finished piece inserted and so on.

This is because although during normal operation the stop catch 97 is in alignment with the lug 110 on the stop lever, when the operator depresses the lever 74 he also draws the rod 76 downwardly. This pulls the end of the rod 88 and the elements carried by it downwardly to the position (A) shown in dot and dash lines in Fig. 2. When he does this the shoulder 100 on the control element 93 engages the top wall 106 of the block 104, as indicated in Fig. 2, and turns this member 93 a partial revolution to the left or counter-clockwise, and this turning movement causes the shoulder 102 on member 93 to engage the lower edge of the catch 97 and shift it upwardly so that it lies by the side of the rod 88 and with the free end 97a of the catch by the side of the free end of the rod 88 as shown by the dot and dash lines of Fig. 2.

Then when the operator releases the pedal 74 the rod 76 is carried upwardly by the spring 77 carrying with it the rod 88 and the catch 97 so that the free ends of both the rod 88 and the catch 97 are located above the level of the top of the lug 110 as indicated in dotted lines (B) of Fig. 2. If now the rod 88 be shifted to the right neither this rod nor the catch 97 will engage the lug 110 but will move over the top of this lug and will have no effect on the stop lever 56 and therefore the machine will not be stopped but will continue its operation. This movement of the bar 88 and the catch 97 over the top of the lug 110 is illustrated by the full line position of Fig. 5. These elements 88 and 97 are shifted to this position by the cam surface 115 on the cam 84 (Fig. 8) engaging the follower 85. This also brings the lug 103 against the wall 105 of the block 104.

As the machine continues to operate the follower 85 runs up onto the cam surface 116 (Fig. 8) and shifts the rod 88 still further to the right to the full line position of Fig. 6. It will be evident that as the lug 103 was against the shoulder 105 this last movement will turn the member 93 clockwise a partial revolution to remove the shoulder 102 away from the lower edge of the catch 97 as shown in Fig. 6. However, as both the rod 88 and catch 97 are on the top wall 111 of the lug 110 the catch 97 cannot drop, but as the follower 85 runs off the cam surface 117 (Fig. 8) the rod 88 and catch 97 are shifted to the left by the spring 118 to the full line position of Fig. 2, and as in this position the catch 97 is no longer held up by the lug 110 on the stop lever this catch drops down to the full line position of Fig. 2 resting on the shoulder 102. It is thus reset to its normal running position with its free end 97a behind and in alignment with the lug 110 and ready to engage this lug and shift the stop lever 66 to the right to stop the functioning of the machine if the rod 88 is again advanced before the catch 97 is again shifted to its elevated position.

The chuck at the loading station starts to close when the follower 83 is about at the position (b) (Fig. 8). It will be noted this is after the follower has run up the cam surface 115. Therefore if the operator does not complete the loading operation and release the pedal 74 before it is time for the chuck to close, shifting of rod 88 to the right by the follower running up cam surface 115 will cause the end of rod 88 to engage lug 110 on stop lever 56 (the rod 88 being in the lower or dot and dash position (A) of Fig. 2) and will shift it to the right to release clutch 45 and stop functioning of the machine. The parts would then be in the positions of Fig. 4. After the pedal is released and rod 88 and catch 97 again raised to their upper position the operator may shift lever 56 to the left or the full line position of Fig. 2 to again start the machine functioning.

If now we assume that the operator does not come to the machine and depress the pedal 74 before the working operation is completed or before the chuck at the loading station starts to close the machine will automatically stop functioning. As indicated, during normal operation the parts are in the full line position of Fig. 2 with the end 97a of the catch 97 below the level of the top 111 of the lug 110 on the stop lever 56, and it is held in this position by the shoulder 102 on the control member 93. If as assumed, the operator does not come to the machine, the relative position of these elements will not be changed before the follower 85 runs onto the cam surface 115 (Figs. 1, 8). As soon as the follower runs up this cam surface from position (a) (Fig. 8) to position (b) it will advance the rod 88 and catch 97 to the right to the full line position of Fig. 3. This will cause the end of the catch 97 to engage the lug 110 on the stop lever 56 and shift it to the right and release the clutch 45, 46 to stop functioning of the machine.

As the functioning of the machine is now stopped and the shaft 22 is no longer being driven it will be evident that there will be no indexing of the turret until the machine is again started by the operator by shifting the lever 56 back to the left to engage the clutch 45, 46. Therefore, if the operator has not arrived in time to remove the finished work from the open chuck at the loading station and inserted a new piece of work before time for the indexing operation, the functioning of the machine will automatically be stopped so that the finished piece of work cannot be carried again to the various working stations to be spoiled by being again passed through the working cycles.

After the machine has been stopped as indicated the operator can depress the pedal 74 and retract the holding bar 62 to remove the work 15 from the open chuck at the loading station, this chuck being still held open by the cam 79 and the rod 58. The cam shaft and its cams with their associated elements are about in the positions shown in Fig. 1 when the functioning of the machine is thus automatically stopped, but the lever 56 will be in the dotted line position. As the operator depresses the pedal 74 to permit removal of the finished work from the chuck at the loading station and the insertion of a new piece of work, this operation draws the end of the rod 88 downwardly to the position shown in Fig. 4 carrying with it the catch 97. This brings the end of the rod 88 behind the lug 110 on the stop lever 56 so that this lever cannot be moved to the left to start the machine until the loading operation has been completed and the pedal 74 released. As soon as the operator releases this pedal after completing the loading operation it is moved to its upper position by the springs, permitting the holding bar 62 to be moved against the newly inserted work in the chuck at the loading station and also permits the spring 77 to raise the bar 76 and rod 88 to the upper positions.

When the end of the rod 88 was depressed to the position of Fig. 4 the shoulder 100 upon control member 93 was pressed against the top wall 106 of the block 104 to turn the element 93 counterclockwise sufficiently to bring the catch 97 to the full line position of Fig. 4, or that is its free end to the same level as the rod 88 by the action of the shoulder 102 carried by the member 93 pressing against the under edge of the lever 97. Thus when the pedal 74 is released the ends of both the rod 88 and the catch 97 will be lifted above the top of the lug 110 on the stop lever and the catch 97 will be held in this position by the frictional action between the head 98 of the stud 94 caused by the spring 95. As now both the elements 88 and 97 are above the top of the lug 110 the operator may shift the lever 56 to the left to start the machine functioning. The parts are now in the position of Fig. 1 and it will be evident that as soon as the machine starts the cam 79 shifts the rod 58 to the left to permit the chuck at the loading station to close. While the chuck is closing the follower 85 is moving along the cam 84 from the position (b) toward the position (c). After the chuck is fully closed the turret starts to index for the next working operation, this indexing starting at about the time the follower 85 reaches the position (c) (Fig. 8).

The clutch drives 18, 19 from the drive shafts 17 to the work spindles 13 were disconnected at about the time the follower 85 was at the position (a) (Fig. 8), or that is just before this element rides up on the cam surface 115, and so as to be fully disconnected before the indexing operation starts.

After the indexing operation the clutches 18, 19 at the working stations are caused to engage to operate the spindles at the work stations and the tools are advanced to perform their operations on the various work pieces. Prior to this time the follower 85 runs on to the raised surface 116 of the cam 84, (Fig. 8) and shifts the rod 88 to the right a sufficient distance to shift the elements 93 and 97 to the right from the full line position of Fig. 5 to the position of Fig. 6. During this movement 103 engages the end wall 105 of the block 104 it turns the member 93 clockwise on its pivot stud on the member 56, thus shifting the shoulder 102 away on its lower edge to the catch 97. The catch 97 and the rod 88 are still over the upper end of the lug 110 and therefore the catch 97 will be held in this elevated position by the lug 110 as indicated in Fig. 6. Immediately after this operation the follower 85 runs down the cam surface 117 (Fig. 8) permitting the spring 118 to shift the rod 88 and the catch 97 to the left, or that is, to the full line position of Fig. 2. As soon as the catch 97 runs off the end of the lug 110 it drops down onto the shoulder 102 as indicated in the full lines, (Fig. 2) and is therefore now reset in the normal running position and ready to shift the stop lever 56 the next time the follower 85 runs up the cam surface 115, unless in the meantime the operator has performed the necessary loading and unloading operations as above described.

Therefore, the function of the cam 116 is to reset the automatic safety stop 97 in a position to stop functioning of the machine if the operator fails to perform the proper operations before the time for the next indexing operation. After the indexing operation has been completed the cam 79 by an offset on the opposite side of the cam drum 78 from that shown in Fig. 1 carries the follower 80 into the outer portion 79a of the cam groove to shift the rod 58 to the right to open the chuck at the loading station to permit the removal of the finished work and the insertion of the new work as described.

Thus it will be evident that this safety stop device prevents indexing of the machine to carry the finished work a second time to the working stations and thus spoil the work should for any reason the operator not complete these unloading and loading operations before the time for the next indexing operation.

If it is not desired to use the automatic stop it may be rendered ineffective by moving the throw-off lever 112, (Fig. 2) from the full line position to the dotted line position. This causes the cam surface 114 to engage the top edge of lever 97 and raise it to the dotted line position so that it is no longer behind the lug 110, and when the rod 88 is next advanced this rod and the catch 97 will merely move over the top of the lug 110 and will not stop the machine.

This device also operates as a safety feature to prevent the operator after he has completed the loading operation from again depressing the lever 74 to move the safety holding device 62 away from the work in the newly loaded chuck before this chuck closes. Thus if the operator has loaded the chuck and shifted the stop lever to start the machine the elements will be in the position of Fig. 5 and the chuck immediately starts to close. It will be evident that as the end of the bar 88 is over the top of the lug 110 the operator cannot depress the lever 74 until after the chuck has closed and the indexing operation has been completed, or that is until after the follower 85 has run down the cam surface 117 (Fig. 8).

Having thus set forth the nature of my invention, what I claim is:

1. In a chucking machine including a rotatable turret, a plurality of work spindles carried by the turret and having work holding means providing loading and working stations, means for indexing the turret between working cycles, means for releasing the work at the loading station between indexing operations, means for preventing removal of the released work, manually operable means for retracting said latter means, and means controlled by said manual means for controlling the functioning of the machine.

2. In a chucking machine including a rotatable turret, a plurality of work spindles carried by the turret providing loading and working stations, work holding chucks carried by the spindles, means for indexing the turret in certain timed relation with the operation of the spindles, means for opening and closing the chuck at the loading station between indexing operations, manually controlled means for holding the work in the opened chuck, means operated in timed relation with the indexing operation and normally in position when operated to stop functioning of the machine, and means operated by the manual means to render said stop means ineffective.

3. In a chucking machine including a rotatable turret, a plurality of work spindles carried by the turret providing loading and working stations, work holding chucks carried by the spindles, means for indexing the turret in certain timed relation with the operation of the spindles, means for opening and closing the chuck at the loading station between indexing operations, manually controlled means for holding the work in the opened chuck, means operated in timed relation with the indexing operation and normally in position when operated to stop functioning of the machine, means operated by the manual means to render said stop means ineffective, and automatic means to reset said stop means in the effective position after the next indexing operation.

4. In a chucking machine including a rotatable turret, a plurality of work spindles carried by the turret providing loading and working stations, work holding chucks carried by the spindles, a cam shaft, a driving means for said shaft, manual means for connecting and disconnecting the driving means, means operated by the cam shaft to index the turret between working cycles, means operated by the cam shaft to cause opening and closing of the chuck at the loading station between indexing operations, stop means for shifting said manual means to disconnect the drive and movable to effective and ineffective positions, a cam on the shaft for operating the stop means, manually operated means to hold the work in the opened chuck at the loading station, means operated by said second manual means to set the stop means in ineffective position, and a cam operated by the shaft for setting the stop means in effective position after the indexing operation.

5. In a machine of the character described including an indexing turret, a plurality of work spindles carried by the turret providing loading and working stations, work holding chucks carried by the spindles, means for opening and closing the chuck at the loading station, and means for indexing the turret, manually operable means at the loading station to hold the work in the opened chuck, a detachable driving means for the indexing and chuck control means, an automatic means normally in position when shifted to release said driving means to stop functioning of the machine, and means operated by operation of the manual means to render said automatic means ineffective.

6. In a machine of the character described, a pivoted lever for controlling functioning of the machine, a longitudinally shiftable rod associated with said lever, a stop means carried by the rod including a shiftable latch normally in position to engage the lever to shift it when the rod is shifted, manually operable means to shift the rod laterally, and means operable by said lateral movement to shift said latch to an ineffective position.

7. In a machine of the character described, a manually operable means to control functioning of the machine, an automatic stop means normally in position when shifted to operate said first means to stop functioning of the machine, automatic means for shifting the stop means in certain timed relation with functioning of the machine, a second manually operable means, and means operated by the second manual means for rendering the stop means ineffective.

8. In a machine of the character described, a manually operable means to control functioning of the machine, a longitudinally shiftable rod associated with said means, means operated in certain timed relation with the functioning of the machine to shift said rod, a stop means carried by the rod including a movable latch normally in position to engage the manual means when shifted to stop functioning of the machine, a control member associated with said latch, a stop associated with said member, and a second manually operable means connected to the rod to shift it laterally and cause the control means to engage said stop to shift the latch to an ineffective position.

9. In a machine of the character described, a manually operable means to control functioning of the machine, a longitudinally shiftable rod associated with said means, means operated in certain timed relation with the functioning of the machine to shift said rod, a body member mounted on the rod, a control member pivotally mounted on the body member, friction means for holding the control member in different positions, a latch pivoted to the body member and adapted to engage the manual member to shift it, a shoulder on the control member adapted to support the latch member, a pair of lugs on the control member, a stationary member adapted to engage said lugs to turn the control member in opposite directions, a second manually operable means connected to the rod to shift it laterally and cause one of said lugs to engage the stationary member and shift the control member to carry the latch to an ineffective position, and means to later shift the rod longitudinally to cause the second lug to engage the stationary member to shift the control member in the opposite direction and permit the latch to move to the effective position.

10. In a machine of the character described, a control means comprising a manually movable member to control functioning of the machine, a longitudinally shiftable rod, a stop means on the rod adapted to engage the first member to shift it, a second manually operable means adapted to shift the rod laterally, means operable by said lateral movement to shift the stop means to an ineffective position, means to shift the rod longitudinally, and means operated by said latter movement to permit the stop to move to the effective position.

11. In a machine of the character described, a control means comprising a manually movable member to control functioning of the machine, a longitudinally shiftable rod, a body member mounted on the rod, a catch pivoted to the body member and adapted to engage the first member on longitudinal movement of the rod to shift it, a control member pivoted to the body member, friction means for holding the control member in adjusted positions, a shoulder on the control member to normally hold the catch in effective position, lugs on the control member, stationary means to engage said lugs to shift the control member in opposite directions, manually operable means to shift the rod laterally to cause one of said lugs to turn the control member in one direction, and a cam to shift the rod longitudinally to cause the other lug to turn the control member in the opposite direction.

12. In a machine of the character described, a control means comprising a manually movable member to control functioning of the machine, a longitudinally shiftable rod, a body member mounted on the rod, a catch pivoted to the body member and adapted to engage the first member, a cam to longitudinally shift the rod to shift the first member, a control member pivoted to the body member, friction means to hold the control member in adjusted positions, a shoulder on the control member to normally hold the catch in effective position, lugs on the control member, stationary stop means to engage said lugs to shift the control member in opposite directions, means to shift the rod laterally to cause one of said lugs to turn the control member to shift the catch to effective position, and a cam to shift the rod longitudinally to cause the other lug to turn the control member in the opposite direction to set the latch in effective position.

13. In a machine of the character described, a control means comprising a manually movable member to control functioning of the machine, a longitudinally shiftable rod, a movable catch mounted on the rod, a control member pivotally mounted on the rod, means on the control member normally supporting the catch in effective position, means for yieldingly holding the control member in adjusted positions, means for shifting the rod laterally, means operating on said movement to shift the catch to ineffective position, means to shift the rod longitudinally, and means operating on said latter movement to shift the control member in the opposite direction and permit return of the catch to effective position.

14. In a machine of the character described, a rotatable turret, a plurality of work spindles carried by the turret providing loading and working stations, work holding means carried by the spindles, means for indexing the turret in certain timed relation with the operation of the spindles, means for releasing the work at the loading station between indexing operations, manually controlled means for retaining the released work in the holding means, means operated in timed relation with the indexing operation and normally in position when operated to stop functioning of the machine, means operated by the manual means to render said stop means ineffective, and automatic means to reset said stop means in the effective position after the next indexing operation.

15. In a machine of the character described, a rotatable turret, a plurality of work spindles carried by the turret providing loading and working stations, automatic means for indexing the turret between working cycles, automatically operated mechanism for stopping functioning of the machine between working cycles, a manually operable mechanism for controlling the work at the loading station, and means operable by said manually operable mechanism for rendering said stop mechanism ineffective.

16. In a machine of the character described, a rotatable turret, a plurality of work spindles carried by the turret providing loading and working stations, means for indexing the turret between working cycles, automatically operated mechanism for stopping functioning of the machine between working cycles, a manually operable mechanism for controlling the work at the loading station, means operable by said manually operable mechanism for rendering said stop mechanism ineffective, means to reset said stop means in the effective position, and means operated in timed relation with the indexing means to operate the resetting means after the next indexing operation.

17. In a machine of the character described, a rotatable turret, a plurality of spindles carried by the turret providing loading and working stations, means for indexing the turret between working cycles, a manually operable mechanism for controlling the work at the loading station, mechanism operated in timed relation with the indexing means for stopping the machine, and control means between the manually operable mechanism and the stop mechanism to render the stop mechanism ineffective if the manual mechanism is operated prior to operation of the stop mechanism.

18. In a machine tool, an automatically operated mechanism controlling operation of the machine, a manually operated mechanism associated therewith for controlling placing of the work, automatically operated mechanism for stopping the first automatically operated mechanism at a given time, and control means between the manually operable mechanism and the stop mechanism to render the stop mechanism ineffective if the manual mechanism is operated prior to said given time.

19. In a chucking machine including a rotatable turret, a plurality of work spindles carried by the turret and having work holding chucks providing loading and working stations, means for indexing the turret between working cycles, means for opening the chuck at the loading station between indexing operations, means for retaining the work in the opened chuck, manually operable means for retracting the retaining means, and means controlled by said manual means for stopping functioning of the machine.

ARTHUR J. LEWIS.